United States Patent
Wan et al.

(10) Patent No.: US 10,742,503 B2
(45) Date of Patent: Aug. 11, 2020

(54) APPLICATION OF SETTING PROFILES TO GROUPS OF LOGICAL NETWORK ENTITIES

(71) Applicant: Nicira, Inc., Palo Alto, CA (US)

(72) Inventors: Da Wan, Beijing (CN); Juntao Gao, Beijing (CN); Jianjun Shen, Palo Alto, CA (US); Donghai Han, Beijing (CN); Qiong Wang, Beijing (CN); Qi Wu, Beijing (CN); Pankaj Thakkar, Cupertino, CA (US); Yuanhui Wang, Beijing (CN); Mengdie Song, Beijing (CN)

(73) Assignee: NICIRA, INC., Palo Alto, CA (US)

( * ) Notice: Subject to any disclaimer, the term of this patent is extended or adjusted under 35 U.S.C. 154(b) by 84 days.

(21) Appl. No.: 15/969,731

(22) Filed: May 2, 2018

(65) Prior Publication Data
US 2019/0342158 A1 Nov. 7, 2019

(51) Int. Cl.
*H04L 12/24* (2006.01)
(52) U.S. Cl.
CPC ........ *H04L 41/085* (2013.01); *H04L 41/0813* (2013.01); *H04L 41/0893* (2013.01)
(58) Field of Classification Search
None
See application file for complete search history.

(56) References Cited

U.S. PATENT DOCUMENTS

| | | | | |
|---|---|---|---|---|
| 8,966,029 B2 * | 2/2015 | Zhang | ..................... | H04L 45/74 709/221 |
| 10,447,541 B2 * | 10/2019 | Gaikwad | ............. | H04L 41/0896 |
| 2004/0073659 A1 * | 4/2004 | Rajsic | ............... | H04L 29/12292 709/224 |
| 2004/0177135 A1 * | 9/2004 | Monaton | ................... | G06F 8/61 709/222 |
| 2011/0246460 A1 * | 10/2011 | Hsieh | ..................... | G06Q 30/02 707/736 |
| 2015/0117256 A1 | 4/2015 | Sabaa et al. | | |
| 2015/0142938 A1 * | 5/2015 | Koponen | ............ | G06F 9/45558 709/222 |
| 2015/0281285 A1 * | 10/2015 | Bharali | ................... | G06F 16/00 726/1 |

(Continued)

OTHER PUBLICATIONS

Non-Published commonly owned U.S. Appl. No. 15/969,736, filed May 2, 2018, 44 pages, Nicira, Inc.

*Primary Examiner* — Joshua Joo
(74) *Attorney, Agent, or Firm* — Adeli LLP

(57) ABSTRACT

Some embodiments provide a method for a network controller. The method receives network configuration data including an association of an entity configuration profile to a logical entity group that references at least two logical network entities. The entity configuration profile includes a set of configuration settings to apply to logical network entities with which the entity configuration profile is associated. The method associates the entity configuration profile with the logical network entities referenced by the logical entity group. Based on the associations of the entity configuration profile with the logical network entities, the method determines multiple host machines that require the configuration data for the entity configuration profile. The method distributes the entity configuration profile to the host machines.

20 Claims, 14 Drawing Sheets

(56) References Cited

U.S. PATENT DOCUMENTS

| | | |
|---|---|---|
| 2015/0317145 A1 | 11/2015 | Katariya et al. |
| 2016/0105534 A1 | 4/2016 | Li et al. |
| 2017/0078150 A1 | 3/2017 | Koganti et al. |
| 2018/0063195 A1 | 3/2018 | Nimmagadda et al. |
| 2019/0303137 A1* | 10/2019 | Chaganti ............... H04L 41/046 |
| 2019/0342175 A1 | 11/2019 | Wan et al. |

* cited by examiner

APPLICATION OF SETTING PROFILES TO GROUPS OF LOGICAL NETWORK ENTITIES

BACKGROUND

Configuration management is a key feature of software defined networking (SDN) in a datacenter. For a typical network management system, many types of entities require configurations and there are many types of configurations for these entities (e.g., security configurations, feature-specific configurations, forwarding configurations, etc.). Because there are so many entities in a typical SDN, changing the configuration settings for a large group of entities (e.g., hundreds of logical ports) can be a time- and resource-intensive process, both on the front-end (the administrator making these changes) and the back-end (the network management system propagating all the changes to the appropriate physical hosts).

BRIEF SUMMARY

Some embodiments provide novel techniques for managing the configuration settings of logical network entities. Specifically, some embodiments allow a network administrator to define entity configuration profiles that can be applied to one or more logical network entities. Each entity configuration profile specifies a set of configuration settings for a particular type of configuration (e.g., a security profile, a quality of service profile, an IPFIX profile, etc.) of the logical network entities with which the profile is associated. In some embodiments, to improve the flexibility and performance of the network management and control system, the entity configuration profiles can be grouped and applied as a group and/or can be applied to groups of logical network entities.

In some embodiments, the network management and control system includes a management plane (e.g., a set of network managers) with an application programming interface (API) through which a user (e.g., a network administrator) provides network configuration data for defining and configuring the logical entities. Through the management plane, the user defines logical network entities (e.g., logical switches, logical switch ports, logical routers, logical router ports, etc.) and entity configuration profiles, groups logical entities into logical entity groups, groups profiles into entity configuration profile sets, etc. The network management and control system of some embodiments also includes a central control plane (e.g., a set of network controllers) that receives these definitions from the management plane, determines the associations of the entity configuration profiles with the logical network entities, and identifies host machines to which to distribute the entity configuration profiles and the associations.

As mentioned, in addition to applying entity configuration profiles to individual logical network entities, some embodiments allow a user to define groups of logical entities and apply entity configuration profiles to the groups. In this case, the central control plane is responsible for associating the entity configuration profile with all of the logical network entities in the group and identifying the host machines on which the logical network entities are implemented in order to distribute the logical entity group and entity configuration profile information to these host machines. By allowing the application of an entity configuration profile to a logical entity group, a network administrator is enabled to change the configuration settings of numerous logical entities with a single transaction (by modifying the entity configuration profile or applying a different entity configuration profile to the logical entity group).

In addition, or as an alternative, some embodiments allow a user to define entity configuration profile sets and apply these to logical network entities. An entity configuration profile set is a group of at least two entity configuration profiles for different types of configuration settings (e.g., a security profile and a quality of service profile) that can be applied to a logical network entity together. Thus, if a user wants to apply all of the profiles in the set to another logical network entity, the user only needs to define the association of the set to the logical network entity, rather than a separate association for each entity configuration profile in the set. In addition, in some embodiments profiles can be associated with other profiles such that application of one profile to a logical network entity automatically applies a different profile to the logical network entity as well. For instance, a particular security profile could be associated with two different quality of service profiles such that application of either of the quality of service profiles to a logical network entity by a user automatically also causes the network controller to associate the security profile with the logical network entity. In some embodiments, the user can also apply an entity configuration profile set to a logical entity group, with the network controller associating each of the entity configuration profiles in the set with each of the logical network entities in the group.

As noted above, the logical network entities in some embodiments may include logical switches, logical switch ports, logical routers, and logical router ports (possibly among other logical network entities). In some embodiments, applying an entity configuration profile (or profile set) to a logical switch automatically applies that entity configuration profile to all of the logical switch ports of that logical switch, and applying an entity configuration profile (or profile set) to a logical router automatically applies that entity configuration profile to all of the logical router ports of the logical router. However, entity configuration profiles and profiles sets may also be applied directly to the logical switch ports and logical router ports.

When an entity configuration profile or profile set is associated with one or more logical network entities (or groups of entities), in some embodiments the central control plane identifies the span for each entity configuration profile or profile set in order to determine the host machines to which the profiles will be distributed. In some embodiments, each logical switch port is associated with an interface on a managed forwarding element (e.g., a virtual interface on a software forwarding element) that operates on a host machine to implement the logical switch (as well as other logical switches and/or logical routers). The central control plane determines the set of interfaces, and thus the set of managed forwarding elements, to which each entity configuration profile maps. When an entity configuration profile is associated with a logical entity group (which itself could include one or more nested logical entity groups), some embodiments flatten the profile to entity associations, so that only associations of entity configuration profiles to individual logical entities (and in some such embodiments, only logical ports) are distributed to the host machines. The central control plane traverses the hierarchy of logical entity groups and logical forwarding element to port associations, as well as the profile sets and inter-profile associations in order to determine the profile to entity associations to distribute to each host machine on which the logical entities are implemented.

A possible result of applying entity configuration profiles directly to logical network entities and to logical entity groups is that two conflicting profiles of the same type (e.g., two security profiles, two quality of service profiles, etc.) might be applied to the same logical network entity. Some embodiments identify such conflicts at the management plane and prevent the user from applying the conflicting configuration. However, other embodiments use priorities for each profile type (e.g., priorities that are unique within a profile type), and apply only the highest-priority entity configuration profile for a particular type to a given logical network entity.

As noted, the central control plane is responsible in some embodiments for flattening the hierarchy of entity configuration profile to logical network entity associations and providing the association data to the host machine (e.g., to a local controller on the host machine that configures the managed forwarding element to implement the logical forwarding elements). When changes are made to the entity configuration profile to logical network entity associations, some embodiments compute the changes at the central control plane level and distribute the changes to the local controllers on the host machines, while other embodiments push down only the direct change to the host machine and rely on the local controllers to compute the changes to the flattened mappings.

For changes to a simple profile to logical switch port mapping, these changes are only provided to a single host machine, so the difference in approaches is minimal. However, for complicated hierarchies, significant computations are required for changes. If the change computation is performed at the central control plane, all of the related parent and child relationships are evaluated by the central control plane. In some embodiments, this may result in updates to the group memberships and profile to entity association changes being sent to host machines that do not actually need the updates, and in potential overloading of the channel between the central control plane and the local controllers (because of the numerous possible changes to nested groups that are distributed).

Other embodiments distribute only the direct change to the host machines, and allow the host machines (e.g., the local controllers) to perform their own computations. While in some cases this could result in more total computation (because some computations will be repeated on multiple hosts), many local controllers will not need to perform the full computation. In some such embodiments, only the host machines that are directly affected by the change will even receive the change, resulting in less computation.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide novel techniques for managing the configuration settings of logical network entities. Specifically, some embodiments allow a network administrator to define entity configuration profiles that can be applied to one or more logical network entities. Each entity configuration profile specifies a set of configuration settings for a particular type of configuration (e.g., a security profile, a quality of service profile, an IPFIX profile, etc.) of the logical network entities with which the profile is associated. In some embodiments, to improve the flexibility and performance of the network management and control system, the entity configuration profiles can be grouped and applied as a group and/or can be applied to groups of logical network entities.

Figure 1:
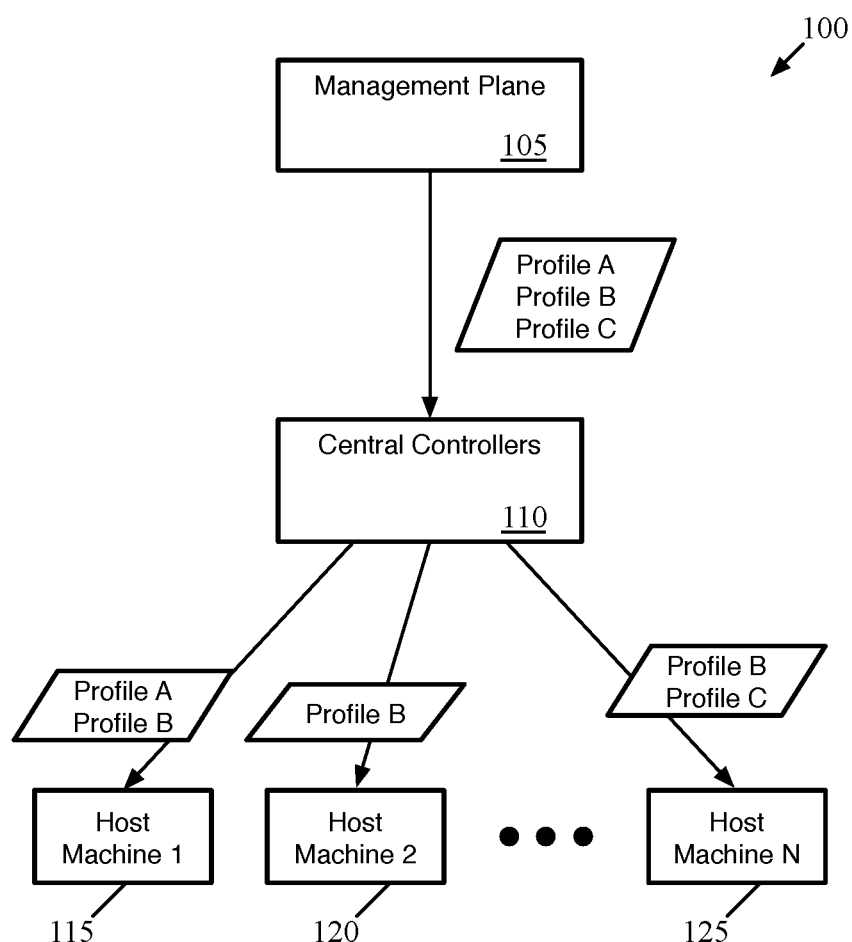
FIG. 1 conceptually illustrates a network management and control system of some embodiments.

FIG. 1 conceptually illustrates a network management and control system 100 of some embodiments. The network management and control system 100 includes a management plane 105, a set of central controllers 110 (also referred to as a central control plane), and a set of host machines 115-125. The management plane 105 is implemented in some embodiments by one or more network managers and includes an application programming interface (API) through which a user (e.g., a network administrator) provides network configuration data for defining and configuring logical networks. Through the management plane API, the user defines logical network entities (e.g., logical switches, logical switch ports, logical routers, logical router ports, etc.) and entity configuration profiles, groups logical entities into logical entity groups, groups profiles into entity configuration profile sets, etc. The logical networks, in some embodiments, are conceptual abstractions of networks (e.g., switches, routers, and connections between them) that are implemented by managed forwarding elements in one or more datacenters.

The set of centralized network controllers 110 (the central control plane) receives the configuration definitions from the management plane 105, identifies the managed forwarding elements (which operate on host machines 115-125 in some embodiments) that require each piece of configuration data, and distributes the configuration data to these host machines. For the associations of entity configuration profiles to logical network entities, the central controllers 110 determine the entity configuration profiles and grouping definitions for each logical network entity and distributes this data to the host machine(s) that implement the logical network entities. The operations of the centralized network controllers 110 will be described in greater detail below. It should also be understood that, though shown in FIG. 1 as separate, in some embodiments the management plane and central control plane are combined into a single network controller application or operate on the same physical controller computers.

The host machines 115-125 implement the logical networks. In some embodiments, each host machine 115-125 operates a managed forwarding element (or set of managed forwarding elements) that implements the logical networks according to the configuration of the logical network entities. The host machines 115-125 may also operate local controllers that receive the configuration data from the central controllers and use this configuration data to configure the managed forwarding elements. In some embodiments, the local controllers and managed forwarding elements execute in the virtualization software (e.g., hypervisor) of the host machines, and implement the logical networks for data compute nodes (e.g., virtual machines, containers, etc.) that are hosted on the machines. The managed forwarding elements may also include gateways for implementing connections between the logical networks and external networks (e.g., the Internet). The gateways operate in the virtualization software of host machines, in virtual machines, or as bare metal machines in different embodiments, and are also managed by local controllers.

In the example shown in this figure, the management plane 105 receives definitions for three profiles (profile A, profile B, and profile C), and provides data about these profiles to the central controllers 110. As examples, profile A could be a security profile, profile B could be a quality of service profile, and profile C could be an IP Flow Information Export (IPFIX) profile.

Figure 2:
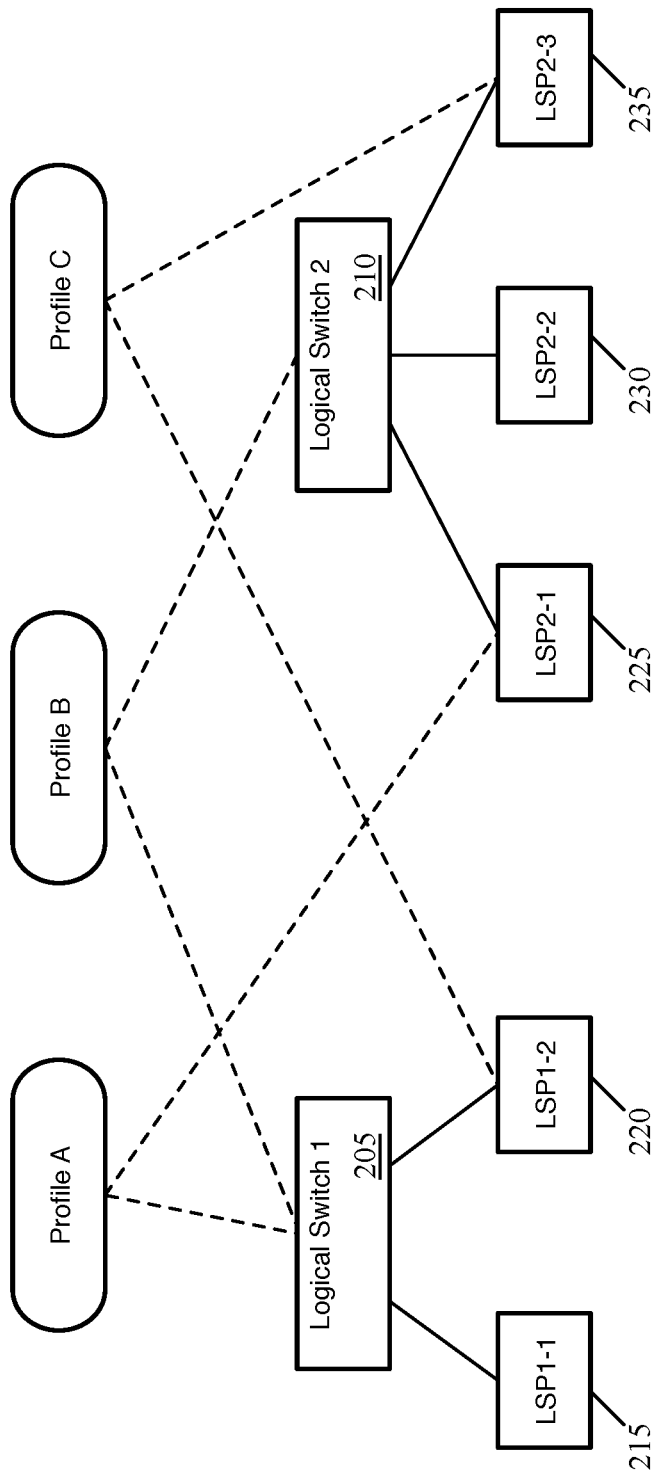
FIG. 2 conceptually illustrates logical network entities that include two logical switches as well as their logical ports, with the profiles configured to apply to these entities.

The management plane 105 also receives information applying these profiles to logical network entities, such as that shown in FIG. 2. This figure illustrates logical network entities that include two logical switches 205 and 210 as well as their logical ports 215-235, with the profiles configured to apply to these entities. Though the logical network entities may include other entities such as logical routers, logical router ports, logical middleboxes (e.g., firewalls, network address translation, load balancers, etc.), in this document logical switches and logical switch ports are used as examples. In some embodiments, applying an entity configuration profile to a logical switch automatically applies that entity configuration profile to all of the logical switch ports of that logical switch, and applying an entity configuration profile to a logical router automatically applies that entity configuration profile to all of the logical router ports of the logical router. In addition, entity configuration profiles may also be applied directly to the logical switch ports and logical router ports.

In this and subsequent figures, solid lines are used to show relationships between logical network entities (e.g., forwarding element to its ports, group membership), while dashed lines are used to show profile to entity associations as well as inter-profile associations. In the example, Profile A is applied to the first logical switch 205 and the logical port 225, Profile B is applied to the first and second logical switches 205 and 210, and Profile C is applied to the logical ports 220 and 235. In some embodiments, application of a profile to a logical switch automatically applies that profile to all of the logical ports of the logical switch.

Returning to FIG. 1, the management plane 105 provides data for all three of the profiles to the central controllers 110. The central controllers 110, in some embodiments, identify the host machines that need to receive each of the profile definitions so that these host machines can properly implement the logical entities according to their associated profiles. In this case, the central controllers 110 provide information for Profiles A and B to the first host machine 115, information for only Profile B to the second host machine 120, and information for Profiles B and C to the last host machine 125. Referring to the configuration shown in FIG. 2, if the first host machine 115 implements logical port 215, then it would receive the Profile A and Profile B information and the mappings of these profiles to the logical switch 215, as well as the other logical switch and logical port configuration data (e.g., instructions for forwarding packets between the logical ports 215 and 220 of the first logical switch 205, information regarding other logical forwarding elements to which the logical switch 205 connects, etc.). Similar corresponding information is provided to the host machines for the other logical ports 220-235.

In the example shown in FIG. 2, the profiles are directly applied to the logical network entities. In some cases, however, a single logical network may have hundreds or even thousands of logical ports, and the administrator might want to apply profiles to large groups of these ports (e.g., all downlink logical router ports, or all logical switch ports that connect to certain types of virtual machines). In this case, adding new profiles or making other changes is a time-intensive operation, as the administrator needs to apply the new profile to all of the necessary ports individually.

Thus, in addition to applying entity configuration profiles to individual logical network entities, some embodiments allow a user to define groups of logical entities and apply entity configuration profiles to the groups. In this case, the central control plane is responsible for associating the entity configuration profile with all of the logical network entities in the group and identifying the host machines on which the logical network entities are implemented in order to distribute the logical entity group and entity configuration profile information to these host machines. By allowing the application of an entity configuration profile to a logical entity group, a network administrator is enabled to change the configuration settings of numerous logical entities with a single transaction (by modifying the entity configuration profile or applying a different entity configuration profile to the logical entity group).

Figure 3:
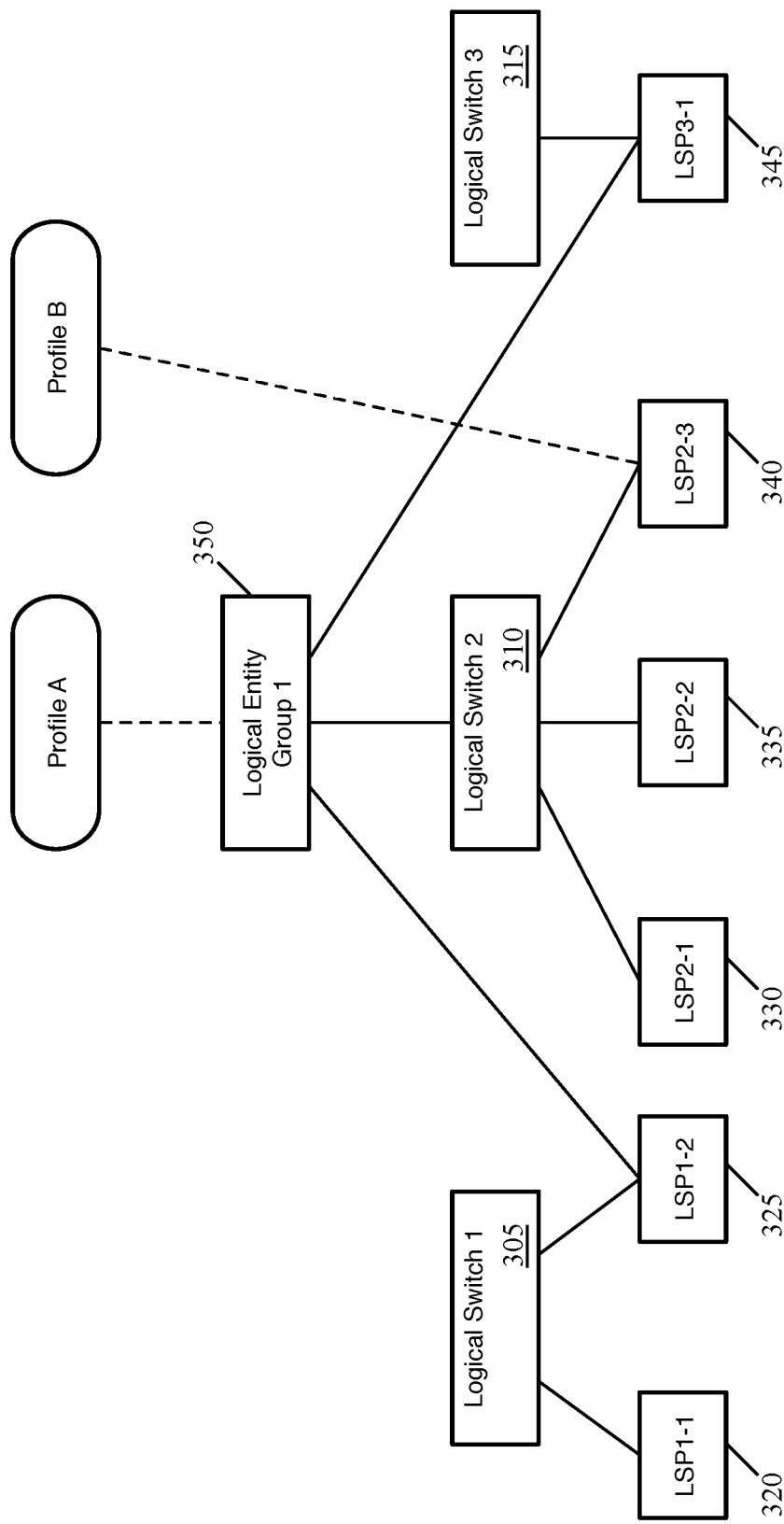
FIG. 3 conceptually illustrates an example of applying a profile to a logical entity group.

FIG. 3 conceptually illustrates an example of applying a profile to a logical entity group. This figure includes three logical switches 305-315, which collectively have six logical ports 320-345. The first logical switch 305 has two logical ports 320 and 325, the second logical switch 310 has three logical ports 330-340, and the third logical switch 315 has one logical port 345. In addition, the administrator defines a logical entity group 350 that includes the second logical switch 310, the second logical port 325 of the first logical switch 305, and the logical port 345 of the third logical switch 315.

The administrator has also specified an association of Profile A to this logical entity group 350, and of Profile B to the third logical port 340 of the second logical switch 310. When the network management and control system (e.g., the central controllers) computes the application of profiles to the leaf logical entities (the logical switch ports), Profile A is applied to logical ports 325-345 (all of the logical ports except the first logical port 320 of the first logical switch 305). Profile B is only applied to the logical port 340. Profile B could represent, for instance, a quality of service profile guaranteeing a particular bandwidth for a web server connected to the logical port 340.

Figure 4:
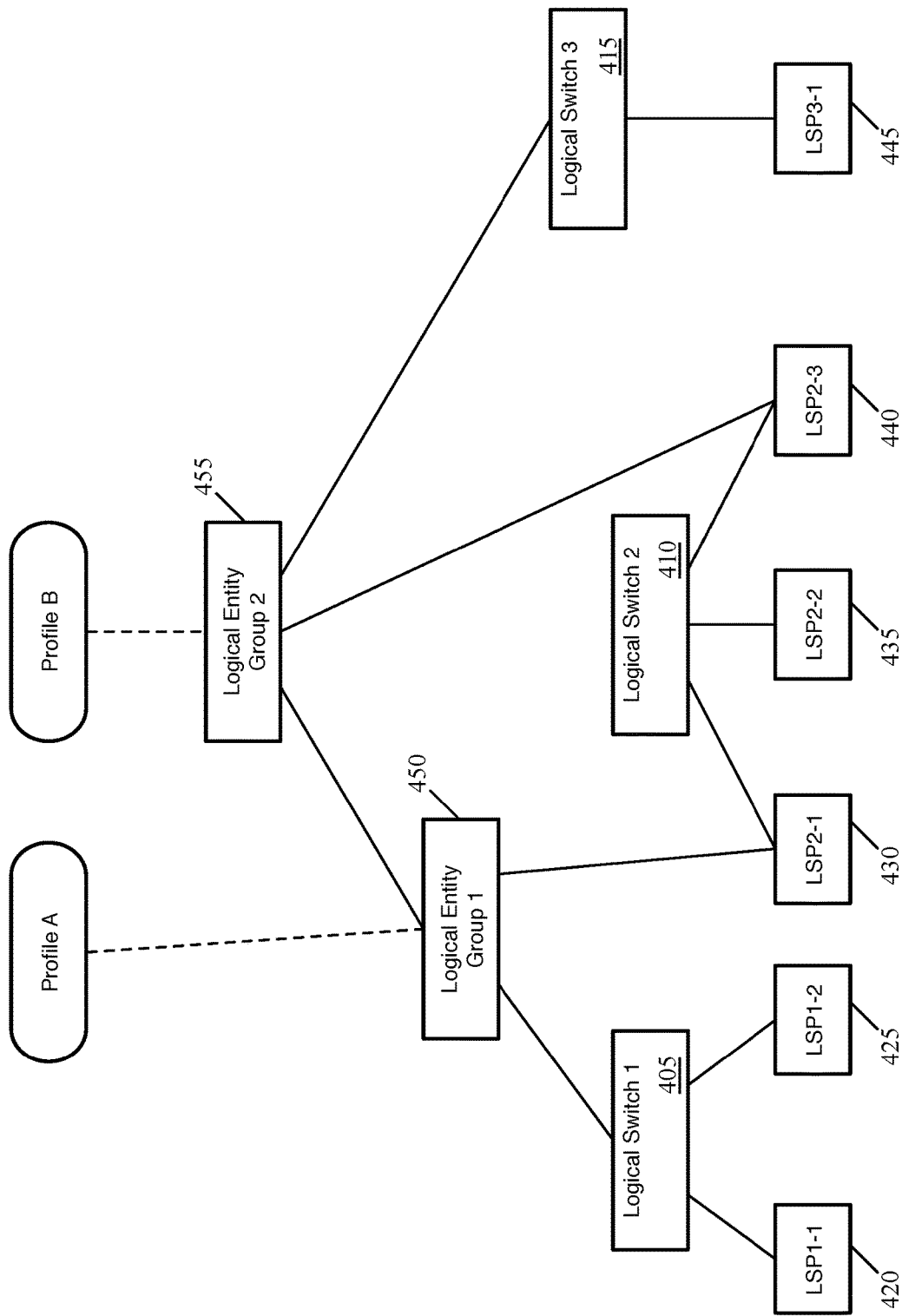
FIG. 4 conceptually illustrates an example of nested groups and the application of profiles to these groups.

In some embodiments, the logical entity groups can include other logical entity groups, in addition to individual logical entities. FIG. 4 conceptually illustrates an example of such nested groups and the application of profiles to these groups. This figure includes three logical switches 405-415, which collectively have six logical ports 420-445 in the same configuration as those in FIG. 3. In this case, a first logical entity group 450 includes the first logical switch 405 and the first logical port 430 of the second logical switch 410. A second logical entity group 455 includes the first logical entity group 450 as well as the third logical port 440 of the second logical switch and the third logical switch 415.

The administrator in this case has specified an association of Profile A to the first logical entity group 450 and an association of Profile B to the second logical entity group 455. When the network management computes the application of profiles to the logical switch ports, Profile A is applied to the first three logical ports 420-430 (based on the inclusion in the first logical entity group 450 of either their logical switch 405 or the port itself), while Profile B is applied to all of the logical ports except the second logical port 435 of the second logical switch 410. In some embodiments, the set of central controllers provides to the local controllers not just the profile definitions and the logical port to entity profile mappings, but also the entire hierarchy of logical groups and profile mappings. As described below, this enables modifications to these groups and profile associations to be handled at least partially at the local controllers on the host machines.

In addition to the application of profiles to logical entity groups, some embodiments allow an administrator (i) to associate profiles with other profiles such that application of one profile to a logical network entity automatically applies a different profile to the logical network entity as well and (ii) to define entity configuration profile sets and apply these to logical network entities. Regarding the first, a particular security profile could be associated with two different quality of service profiles such that application of either of the quality of service profiles to a logical network entity by a user automatically also causes the network controller to associate the security profile with the logical network entity.

Figure 5:
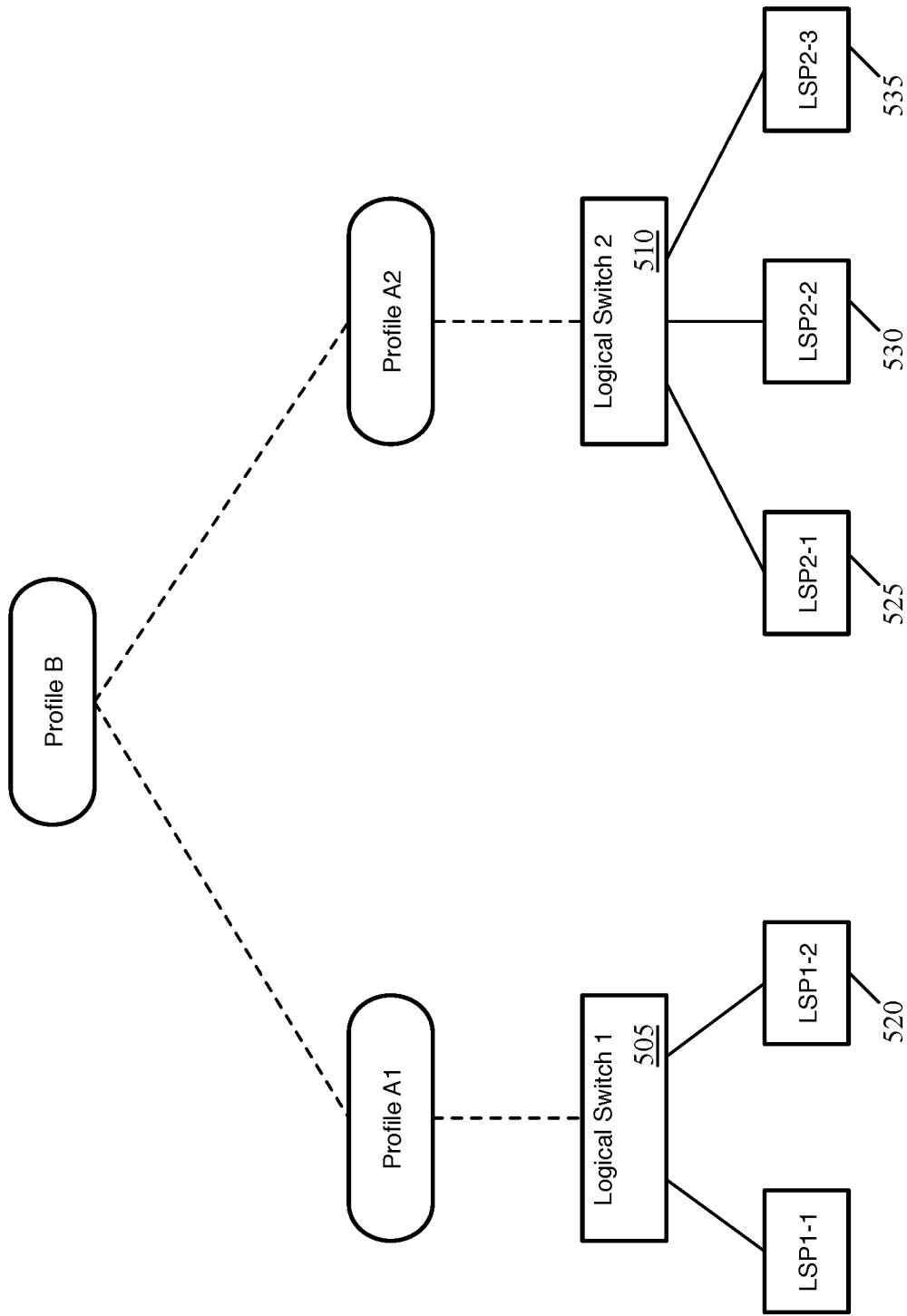
FIG. 5 conceptually illustrates an example of inter-profile associations.

FIG. 5 conceptually illustrates an example of these inter-profile associations. This figure includes two logical switches 505 and 510 which collectively have five logical ports 515-535. The first logical switch 505 has two logical ports 515 and 520, while the second logical switch 525-535. For the profiles, the administrator has associated Profile B with both Profile A1 and Profile A2. As an example, Profiles A1 and A2 could be two different quality of service profiles (e.g., with different guaranteed bit rates and throughputs), and Profile B could be a security profile that the administrator wants to apply with either of the quality of service profiles. When the network management and control system computes the application of profiles to the logical switch ports, Profiles A1 and B are applied to the logical ports 515 and 520 of the first logical switch 505 and Profiles A2 and B are applied to the logical ports 525-535 of the second logical switch 510.

An entity configuration profile set is a group of at least two entity configuration profiles for different types of configuration settings (e.g., an IPFIX profile and a quality of service profile) that can be applied together to a logical network entity. Thus, if an administrator wants to apply all of the profiles in the profile set to a new logical network entity, the user only needs to define the association of the profile set to the logical network entity, rather than a separate association for each profile in the profile set. For example, if profiles have dependencies (such that a particular configuration setting in a first type of profile requires a specific setting in a second type of profile), then the administrator might want to link these in a profile set. For instance, a spoofguard profile that enables spoofguard needs specific IP discovery settings to work properly, so an administrator might link the spoofguard enable profile to an IP discovery profile with the correct settings.

Figure 6:
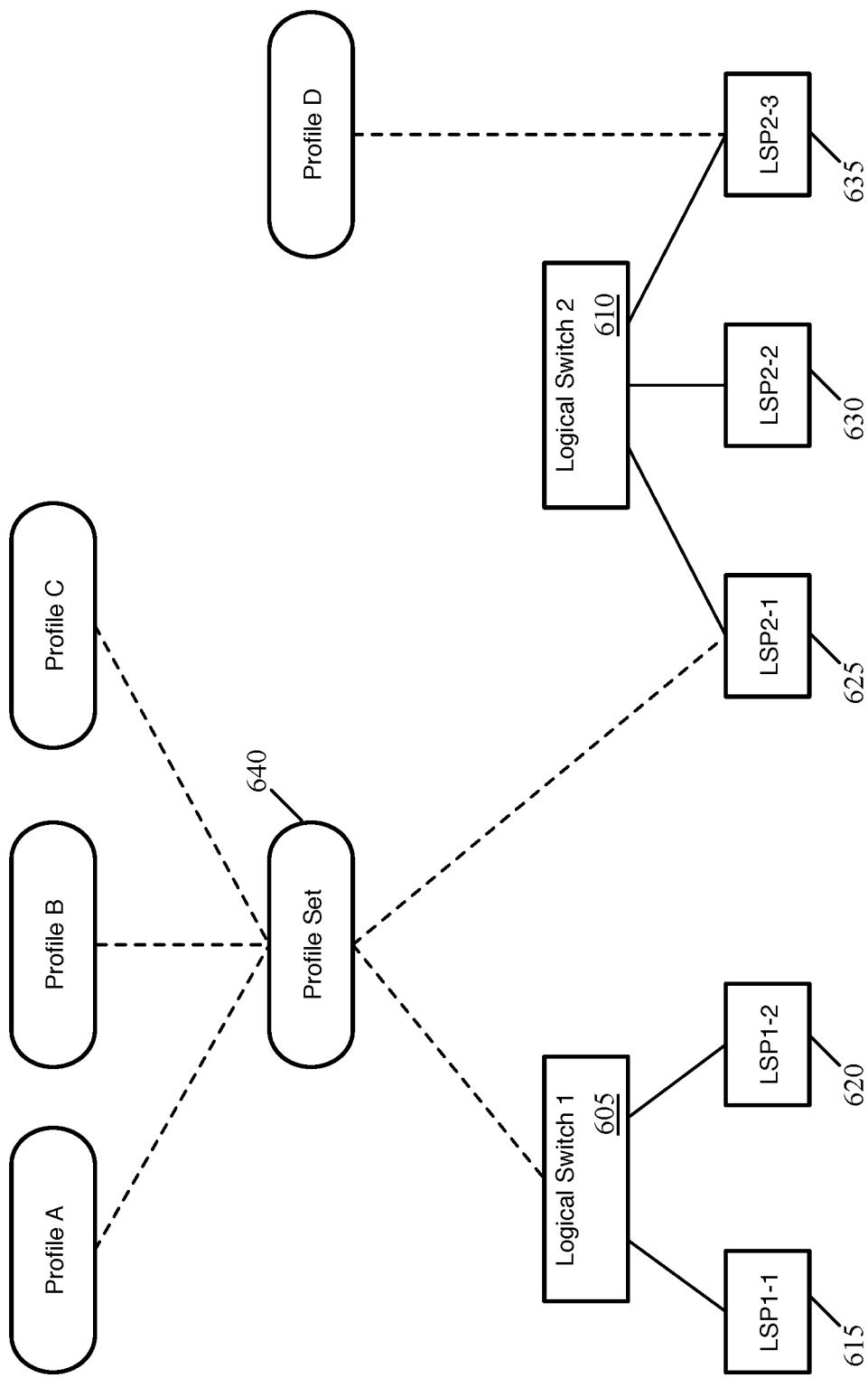
FIG. 6 conceptually illustrates an example of the application of a profile set to logical network entities.

FIG. 6 conceptually illustrates an example of the application of a profile set to logical network entities. This figure includes two logical switches 605 and 610, with five logical ports 615-635 in the same configuration as in FIG. 5. The figure also illustrates that the administrator has formed the association of three Profiles A, B, and C (e.g., a security profile, a quality of service profile, and an IPFIX profile) into an entity configuration profile set 640, and associated this profile set 640 with the first logical switch 605 and the first logical port 625 of the second logical switch 610. In addition, the separate Profile D is associated with the third logical port 635 of the second logical switch 610. When the network management and control system computes the application of profiles to the logical switch ports, Profiles A, B, and C are all associated with both logical ports 615 and 620 of the first logical switch 605 as well as the first logical port 625 of the second logical switch 610. If the administrator later wants to associate another profile (e.g., a set of firewall rule templates) with these three logical ports, the administrator can add this new profile to the profile set 640 and the network management and control system will automatically apply the new profile to all of the logical ports associated with the profile set.

Figure 7:
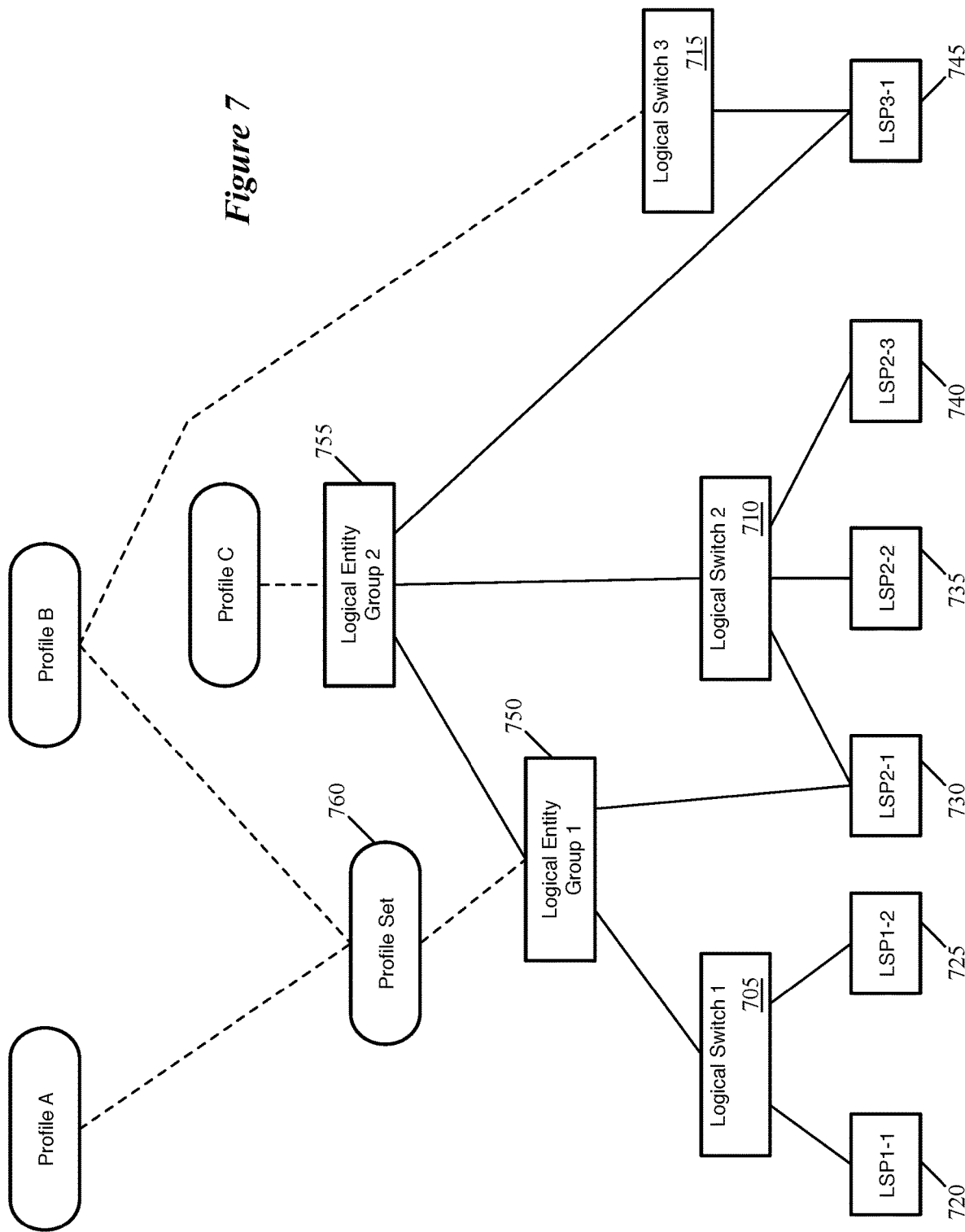
FIG. 7 conceptually illustrates an example of the application of a profile set to a logical entity group.

In some embodiments, the user can also apply an entity configuration profile set to a logical entity group, with the network controller associating each of the entity configuration profiles in the set with each of the logical network entities in the group. FIG. 7 conceptually illustrates an example of the application of a profile set to a logical entity group. This figure includes three logical switches 705-715, with six logical ports 720-745 in the same configuration as those shown in FIG. 3. The network administrator has also defined a first logical entity group 750 that includes the first logical switch 705 and the first logical port 730 of the second logical switch 710, as well as a second logical entity group 755 that includes the first logical entity group 750 as well as the second logical switch 710 and the logical port 745 of the third logical switch 715.

In addition, the administrator has formed the association of Profile A and Profile B into an entity configuration profile set 760, and associated this profile set 760 to the first logical entity group 750. Profile B, one of the profiles in the profile set 760, is also individually associated with the third logical switch 715. Separately, the administrator has associated Profile C with the second logical entity group 755. As a result, the network management and control system computes the application of Profile C to all six of the logical switch ports 720-745. Via the profile set 760, Profile A and Profile B are also applied to both logical ports 720 and 725 of the first logical switch 705 as well as the first logical port 730 of the second logical switch 710, while Profile B is also applied to the logical port 745 of the third logical switch 715.

Figure 8:
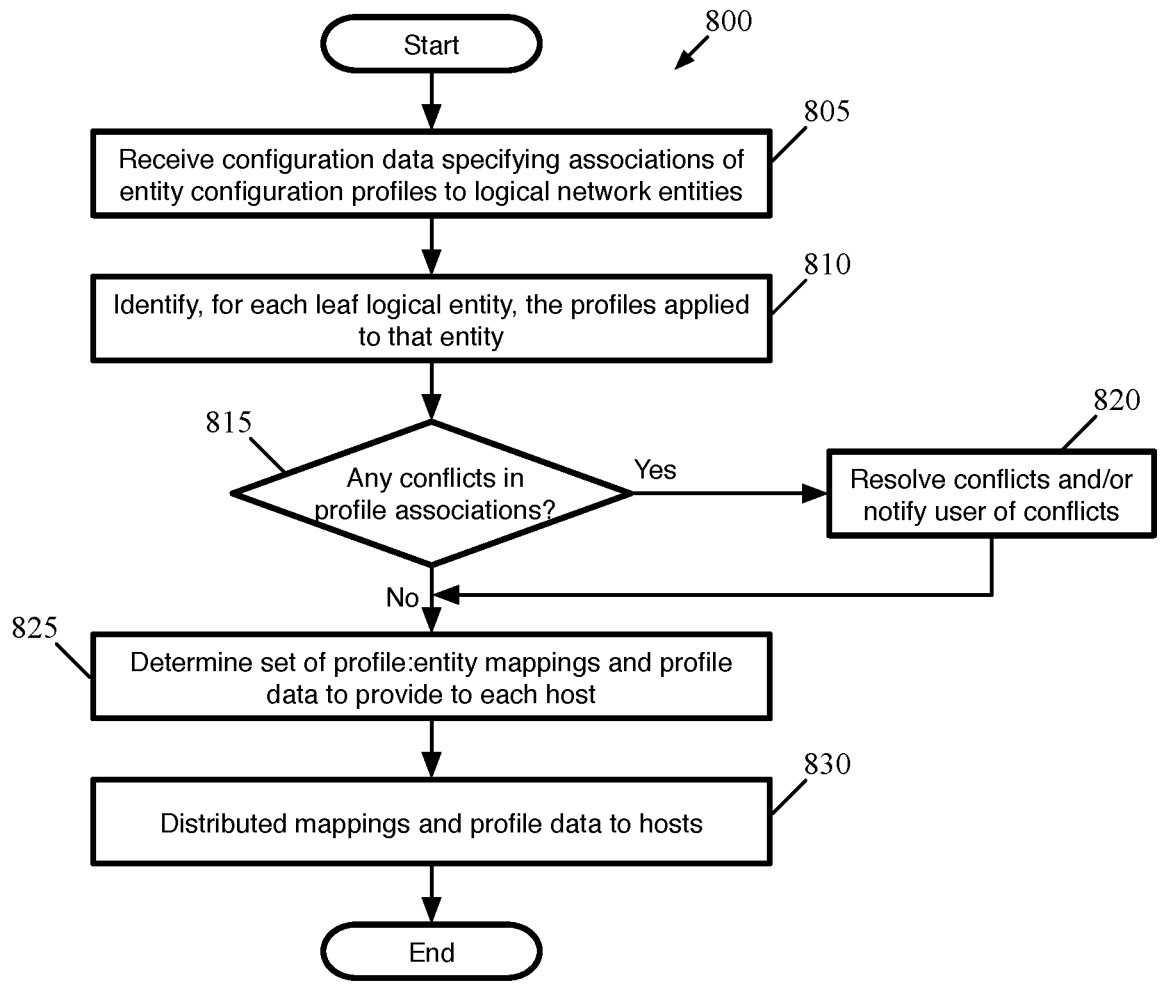
FIG. 8 conceptually illustrates a process of some embodiments for distributing profile association data regarding logical network entities to the host machines that implement the logical network entities.

When an entity configuration profile or profile set is associated with one or more logical network entities (or logical entity groups), in some embodiments the central control plane identifies the span for each entity configuration profile or profile set in order to determine the host machines to which the profiles will be distributed. FIG. 8 conceptually illustrates a process 800 of some embodiments for distributing profile association data regarding logical network entities to the host machines that implement the logical network entities. In some embodiments, the process 800 is performed by a centralized network controller or set of network controllers that manage multiple host machines. The process 800 will be described in part by reference to FIG. 9, which demonstrates a case of profile conflicts, and FIGS. 10A-B, which illustrates span computation for a set of profile associations.

As shown, the process 800 begins by receiving (at 805) configuration data specifying associations of entity configuration profiles with logical network entities. In some embodiments, the management plane receives these associations through its API (based on a network administrator interacting with a user interface) and provides the associations to the central controller. Examples of such associations are shown in FIGS. 2-7, and may include groupings of logical entities, direct associations of profiles with logical entities, inter-profile associations, definitions of profile sets and associations of those profile sets with logical entities, and associations of profiles and profile sets with logical entity groups. In addition, the central control plane receives the set of configuration settings that make up each profile definition (e.g., the throughput, bit rate, etc. guarantees for a quality of service profile, the flow templates for an IPFIX profile, etc.), as well as other configuration data for the logical entities (e.g., the MAC and IP addresses assigned to the various logical ports, etc.).

Next, for each leaf logical entity, the process 800 identifies (at 810) the profiles that apply to that entity. In some embodiments, the leaf logical entities are the logical switch ports to which virtual machines or other data compute nodes connect. In addition, in certain cases, logical router ports (e.g., uplink ports that connect to external networks) are also leaf logical entities. The managed forwarding element data plane operates in terms of the leaf logical entities in some embodiments, and thus this is the data that the central control plane distributes to the host machines. In some embodiments, to determine these profile mappings, the central controllers traverse the hierarchy upwards (from the leaf logical entities to the switches, groups, and profile associations) to determine the set of profiles that are applied to each logical port, as described above for FIGS. 2-7.

With the profiles applied to each logical entity identified, the process 800 determines (at 815) whether there are any conflicts between profiles applied to the logical entities. A possible result of applying profiles directly to logical network entities as well as to logical entity groups is that, in a large logical network, two conflicting profiles of the same type (e.g., two security profiles, two quality of service profiles, etc.) might be applied to the same logical network entity. In addition, profiles with dependencies on the settings of other profiles can also create conflicts. If a particular configuration setting in a first profile requires a first option for a second profile, but a third option is set for the second profile instead, then the first and second profiles will be in conflict.

Some embodiments identify such conflicts at the management plane and prevent the user from applying the conflicting configuration. However, for larger networks, this may entail a large amount of computation every time a user considers applying a profile association change. As such, other embodiments provide mechanisms for the central controllers to resolve such conflicts when possible.

Thus, the process 800 resolves (at 820) any conflicts with the application of profiles to the logical entities. For conflicts that cannot be resolved (e.g., for settings of one profile type that cannot work with settings of another profile type), some embodiments automatically notify the administrator so that the administrator can manually resolve the issue (by changing the profile definition or the application of the profile to the entity). In order to resolve conflicts when a logical entity has multiple different profiles of the same type applied, some embodiments use priorities for each profile. These priorities are unique, at least within a profile type, and the controller applies only the highest-priority entity configuration profile of a particular type associated with a given logical network entity to that entity.

Figure 9:
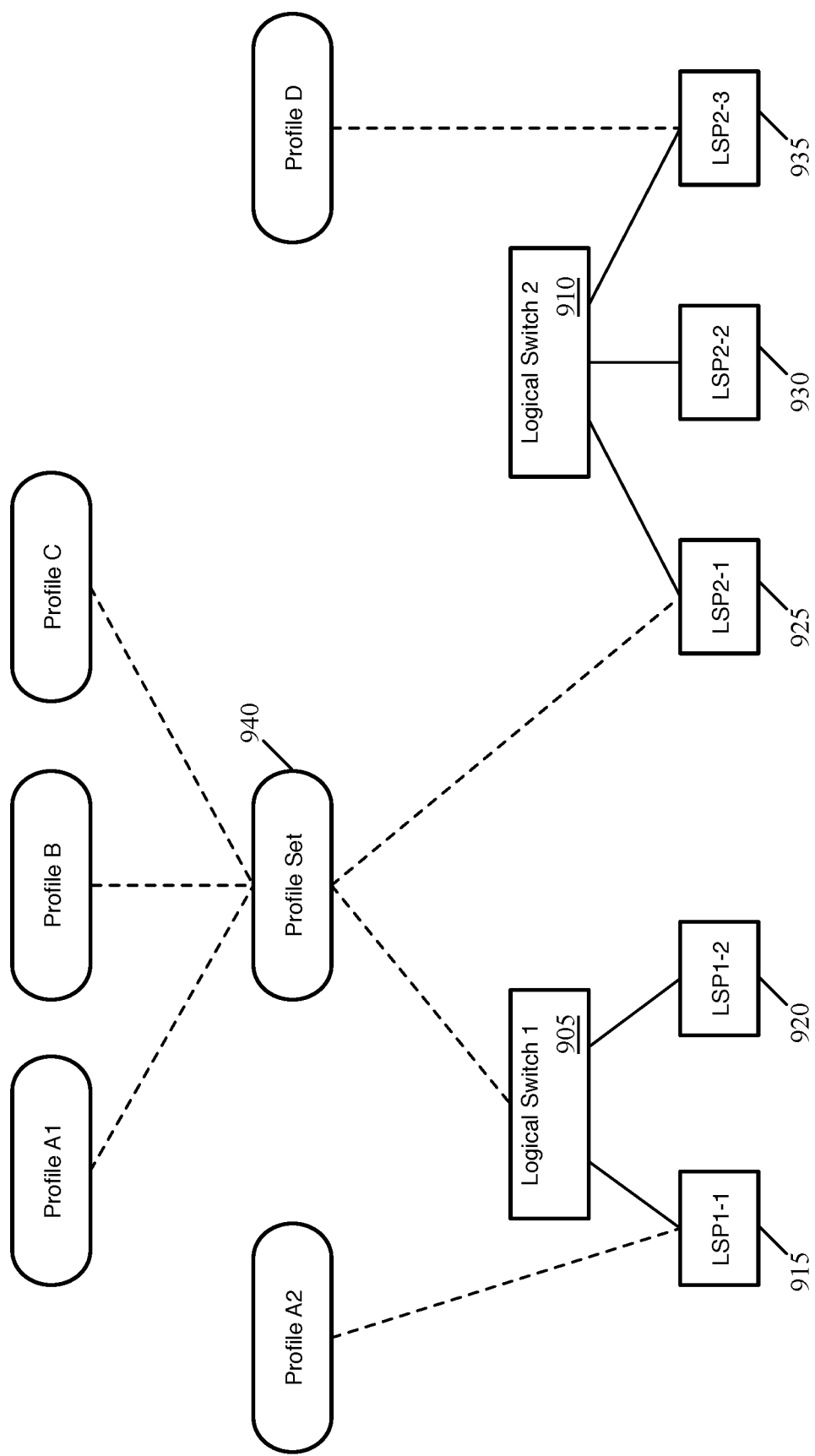
FIG. 9 conceptually illustrates an example of the association of conflicting profiles with a logical entity.

FIG. 9 conceptually illustrates an example of the association of conflicting profiles with a logical entity. This figure includes two logical switches 905 and 910, with five logical ports 915-935 in the same configuration as in FIG. 5. An administrator has associated a profile set 940, that includes Profile A1, Profile B, and Profile C, with the first logical switch 905 and the first logical port 925 of the second logical switch 910. In addition, the administrator has associated Profile A2 directly with the first logical port 915 of the first logical switch 905. As such, in computing the application of profiles to the logical ports, the network controller identifies that two profiles of the same type, Profile A1 and Profile A2, are both associated with the logical port 915. Situations such as this may arise in larger networks when the administrator might not realize that Profile A1 is already associated with the logical port 915 through a large entity group or because the profile set 940 is applied to numerous logical switches. In some embodiments, as mentioned, one of Profile A1 and Profile A2 has a higher priority and is automatically applied to the logical port 915. In other embodiments, the controller identifies which profile has a more direct association with the logical entity (in this case, Profile A2, which is associated directly with the logical port 915) and applies this profile to the logical entity. In either case, some embodiments also notify the administrator (e.g., via the management plane API) so that the administrator can ensure that the desired profile is applied to the logical entity, in case the automatic disposition is not what the administrator intended.

After resolving the conflicts (or if there are no conflicts to resolve), the process 800 determines (at 825) the set of profile entity mappings and profile data to provide to each host machine and distributes (at 830) these mappings and the profile data to the host machine. In some embodiments, each logical switch port is associated with an interface on a managed forwarding element (e.g., a virtual interface on a software forwarding element) that operates on a host machine to implement the logical switch (as well as other logical switches and/or logical routers). Based on the profiles associated with each logical entity, the central controllers determine the set of interfaces, and thus the set of managed forwarding elements, to which each entity configuration profile maps. As described above, some embodiments flatten the profile to entity associations, so that only associations of entity configuration profiles to individual logical entities (and in some such embodiments, only logical ports) are distributed to the host machines. Other embodiments make these determinations, but also distribute the entire relevant portion of the hierarchy to the host machines, so that the hosts can perform computations relating to changes in the hierarchy.

Figure 10A:
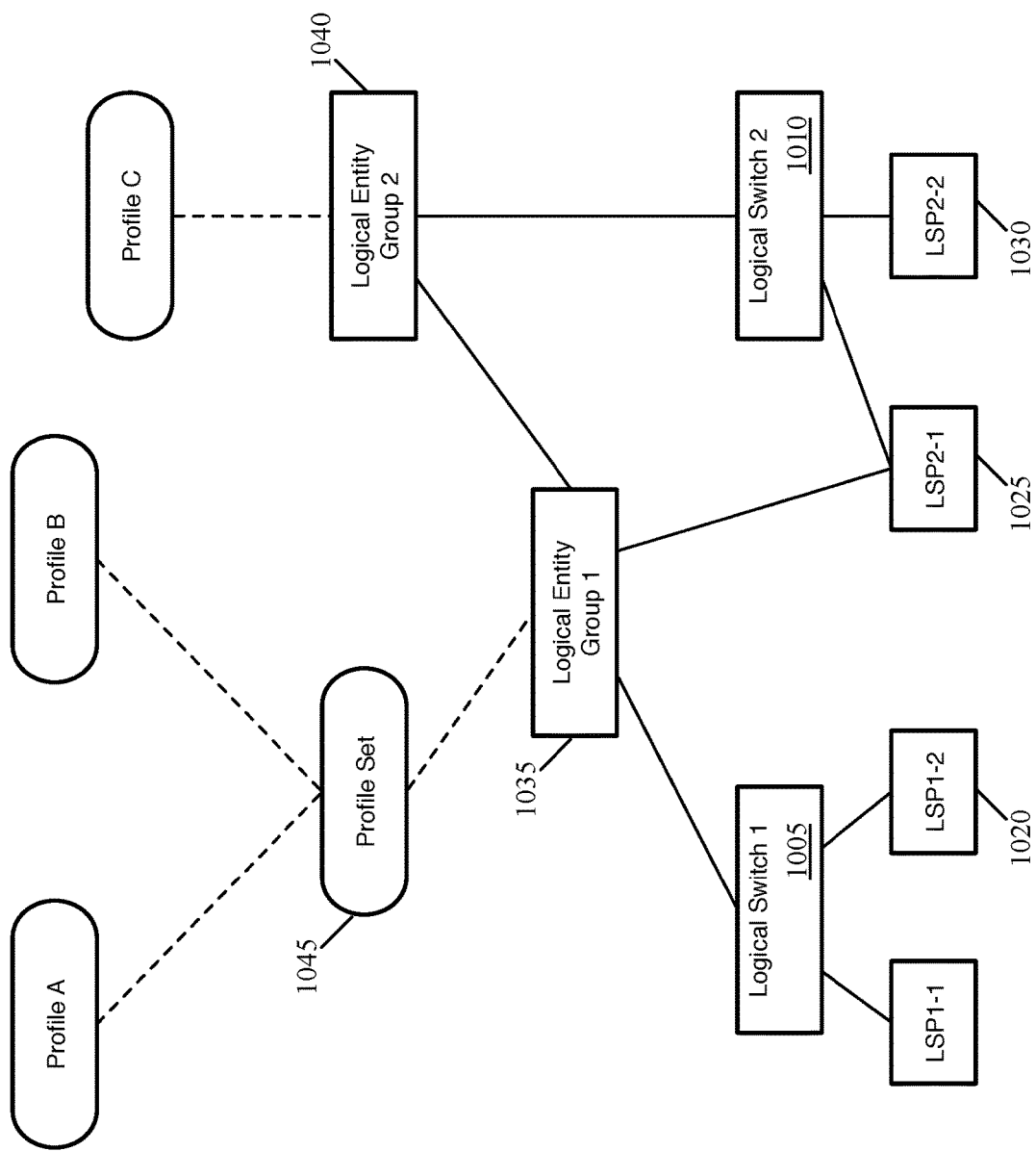
FIGS. 10A-B conceptually illustrate a hierarchy of profiles applied to logical network entities and the portions of that hierarchy distributed to host machines that implement the logical ports.
Figure 10B:
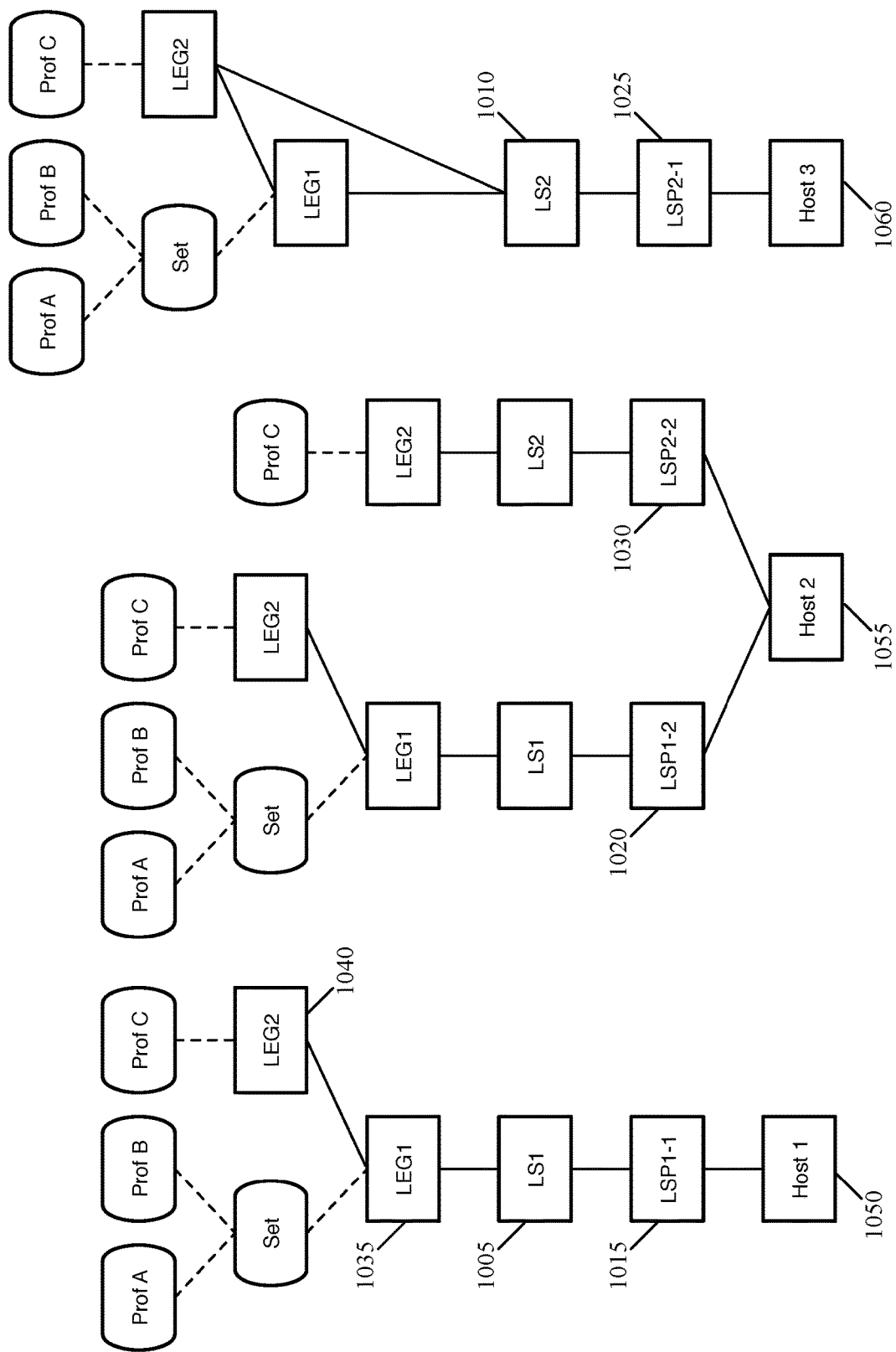

FIGS. 10A-B conceptually illustrate a hierarchy of profiles applied to logical network entities and the portions of that hierarchy distributed to host machines that implement the logical ports. As shown in FIG. 10A, the configuration includes a first logical switch 1005 with two logical ports 1015 and 1020 as well as a second logical switch 1010 with two logical ports 1025 and 1030. Two logical entity groups are defined, with a first group 1035 including the first logical switch 1005 and the first logical port 1025 of the second logical switch 1010. The second logical entity group 1040 includes the first group 1035 and the second logical switch 1010. The administrator has defined a profile set 1045 including Profile A and Profile B, and associated that profile set 1045 with the logical entity group 1035. In addition, Profile C is associated with the second logical entity group 1040.

FIG. 10B illustrates the hierarchical data provided to each host machine in some embodiments. As shown, in this case, there are three hosts 1050. For simplicity this figure does not show the virtual interfaces of the managed forwarding elements operating on the hosts, but there is a 1:1 correspondence between logical switch ports and virtual interfaces in some embodiments. The managed forwarding element at the first host 1050 includes a virtual interface corresponding to the first logical switch port 1015 of the first logical switch 1005. As shown, the hierarchy for this logical switch port means that all three of the Profiles A, B, and C are applied to the logical switch port 1005. The central controllers thus distribute to the host machine 1050 the profile definitions for these profiles along with data indicating that the profiles are applied to the logical switch port 1005. In addition, some embodiments distribute the entire hierarchy above the logical switch port 1005 to the host machine 1050, including the group definitions for logical entity groups 1035 and 1040 and the profile associations to these groups (as well as the definition for the profile set 1045).

The managed forwarding element on the second host 1055 includes virtual interfaces corresponding to two logical ports 1020 and 1030, and thus receives the profile mappings and hierarchical data for two logical ports. For the logical port 1020, the second host 1055 receives the same data as the first host 1050 receives for its single logical port 1015. In addition, this host 1055 receives data indicating that Profile C is applied to the logical port 1030, with the hierarchy of logical entity and profile association hierarchy for this port. Lastly, the third host 1060 receives the corresponding data for the logical port 1025. In this case, Profile C is applied to the logical port both through its direct association with the logical switch 1010 as well as through the hierarchy of logical entity groups.

The profile to entity associations are not static during the operation of a logical network, as the administrator may add or delete logical entities, change profile definitions, add new profiles, change the application of profiles to entities and groups, change entity group membership, etc. As discussed in detail above, the central control plane is responsible in some embodiments for computing the application of profiles to the logical entities and providing these associations to the host machine (e.g., to the local controllers on the host machine, so that the local controller can configure the managed forwarding element on the host machine to implement the logical entities correctly). In addition, the entire hierarchy (at least as that hierarchy relates to the leaf logical entity implemented on a particular host machine) is provided to the host machines as well in some embodiments.

When changes are made to the profile to entity associations (e.g., by directly changing the association of a profile or profile set with an entity group, by changing group membership, etc.), some embodiments compute all of the changes at the central control plane level and distribute the changes to the local controllers on the host machines. Other embodiments, however, push down only the direct change to the relevant host machines and rely on the local controllers to compute the changes to the flattened mappings.

Figure 11:
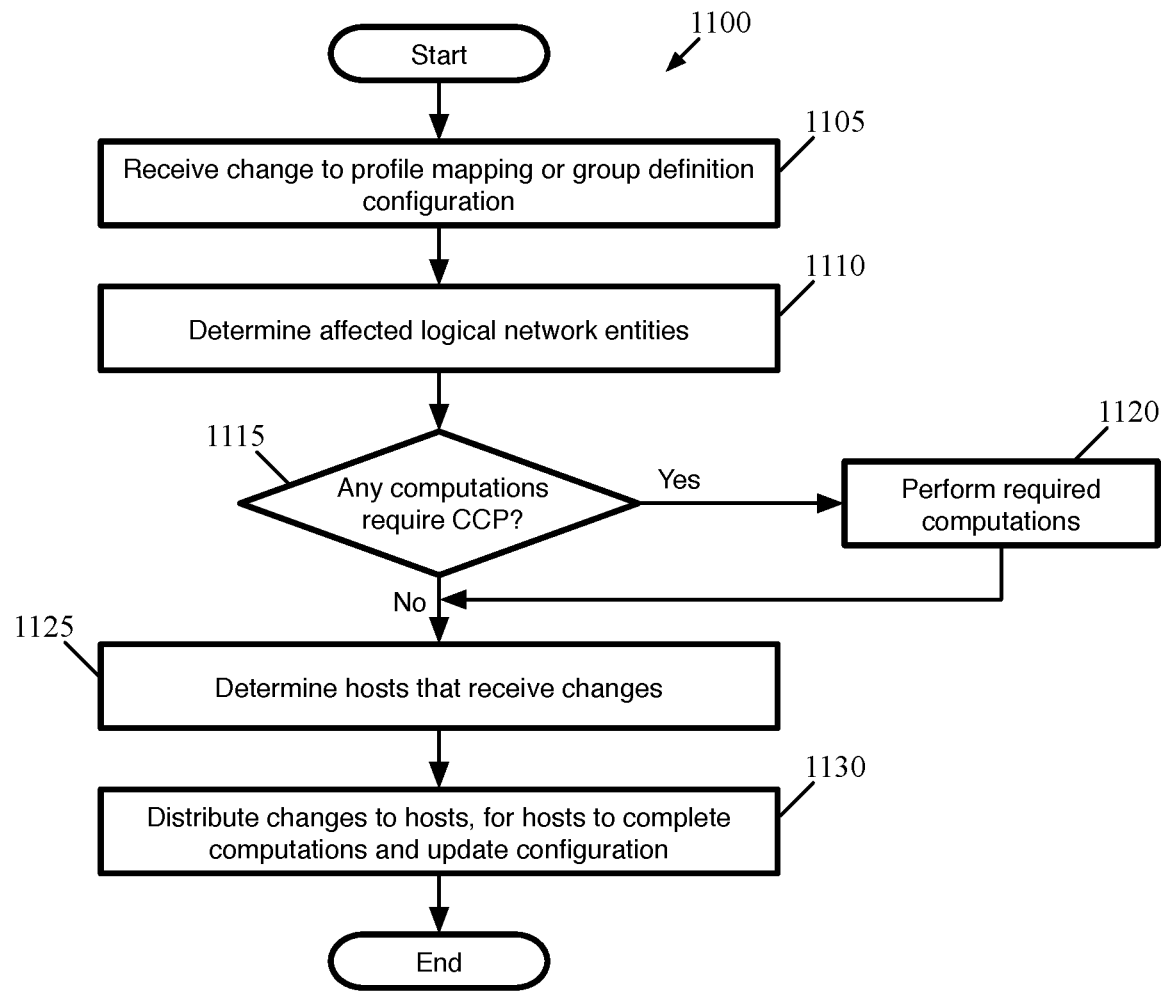
FIG. 11 conceptually illustrates a process of some embodiments for managing changes to the profile to entity association hierarchy.

FIG. 11 conceptually illustrates a process 1100 of some embodiments for managing changes to the profile to entity association hierarchy. The process 1100 of some embodiments is performed by the central controllers in some embodiments, and a separate process to complete a particular change may be performed by each of the host machines affected by the change. The process 1100 will be described in part by reference to FIG. 12, which conceptually illustrates a change to an entity group membership.

Figure 12:
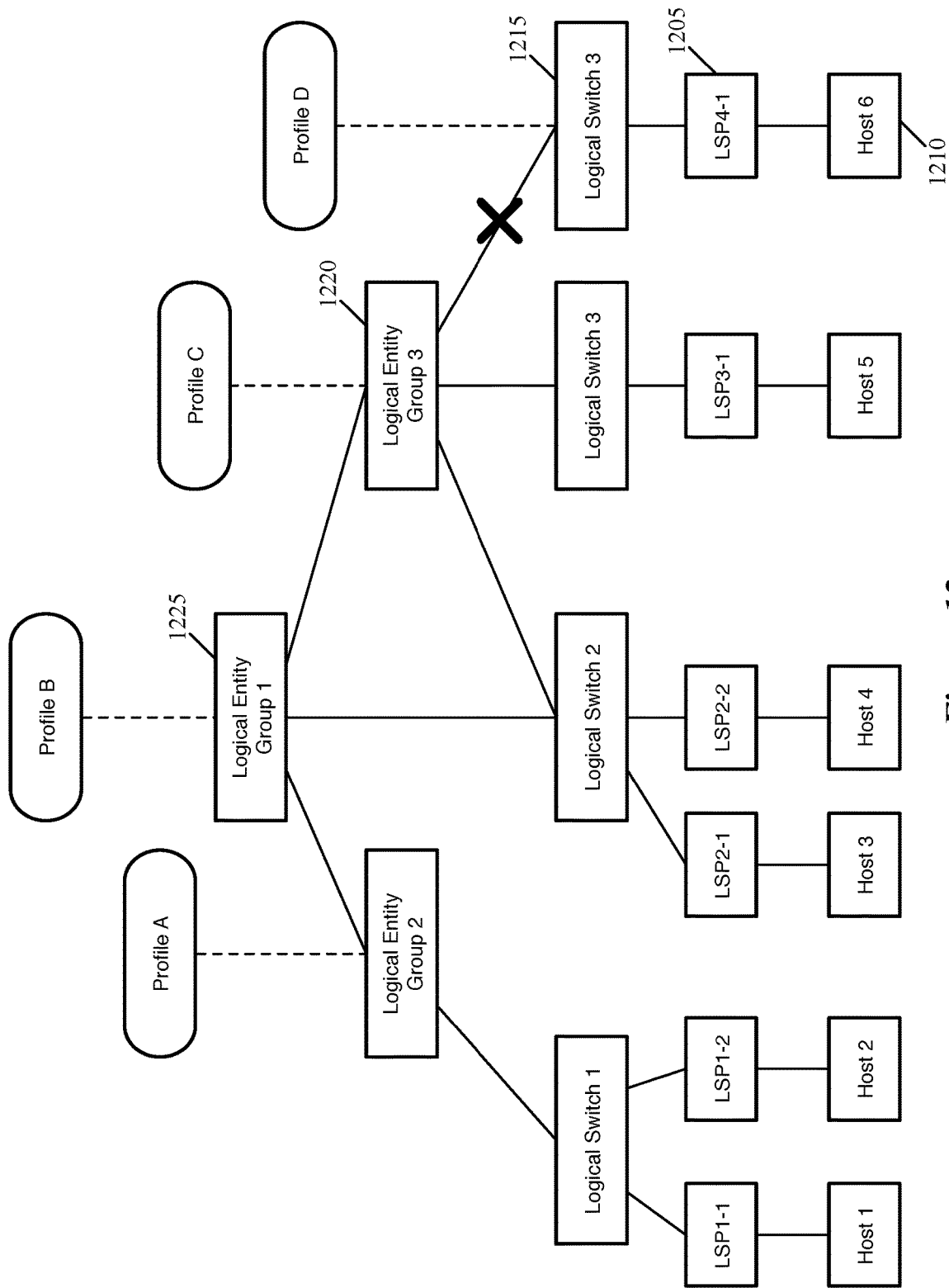
FIG. 12 conceptually illustrates a hierarchy including several logical entity groups that themselves include various logical entity groups and logical switches, each of which includes at least one logical port.

The process 1100 begins by receiving (at 1105) a change to a profile mapping or a group definition configuration. For instance, an administrator might add or remove a logical entity (or a group) to/from a logical entity group, associate a profile or profile set (or remove the association of a profile or profile set) with a logical entity or logical entity group, add or remove a profile to/from a profile set, etc. FIG. 12 conceptually illustrates a hierarchy including several logical entity groups that themselves include various logical entity groups and logical switches, each of which includes at least one logical port. The figure also illustrates that each of these logical ports is implemented on a different host machine.

In this example, a logical port 1205 is implemented by a virtual interface of a managed forwarding element (not shown) on the host machine 1210. This logical port 1205 is part of the fourth logical switch 1215, which belongs to a third logical entity group 1220, which in turn belongs to a first logical entity group 1225. Profile B is associated with the first logical entity group 1225, Profile C is associated with the third logical entity group 1220, and Profile D is directly associated with the logical switch 1215. As shown by the X in this figure, the administrator modifies this hierarchy to remove the logical switch 1215 from the logical entity group 1220.

The process then determines (at 1110) the affected logical network entities. In some embodiments, this includes all logical switches that have their logical ports changed, any logical groups the membership of which changes (or whose members change), any logical ports that are members of affected groups or belong to affected logical switches, any groups or entities that have their profile associations changed, etc. In the example of FIG. 12, the logical switch 1215 being removed from the third logical entity group 1220 affects not only this logical switch and group, but also the logical port 1205 and the first logical entity group 1225. In addition, in some embodiments, the other logical ports and entities are treated as affected because they are members of groups the membership of which has changed.

In the process 1100, computation resulting from the changes is divided between the central control plane and the local controllers at the host machines. As mentioned, some embodiments perform all of the computation at the central controller while other embodiments push as much computation down to the host machines as possible, with still other embodiments using approaches in-between these two extremes. In the former case, the central controller initially only needs to provide the host machine with the profile to logical port associations (i.e., there is no need for the host machines to receive the full hierarchy of groupings), and with subsequent changes the central controllers in some embodiments recompute the associations and provides the new associations to the hosts. For a complicated hierarchy, all of the related parent and child relationships may need to be evaluated by the central control plane. If the host machines are provided the full hierarchy, this may result in updates to the group memberships and profile to entity association changes being sent to host machines that do not actually need the updates, and in potential overloading of the channel between the central control plane and the local controllers (because of the numerous possible changes to nested groups that are distributed). For changes to a simple profile to logical port association, the difference in approaches is minimal as not much computation is required at either level.

Other embodiments, as in the process 1100, distribute only the direct change to the host machines, and allow the host machines (e.g., the local controllers) to perform their own computations. While in some cases this could result in more total computation (because some computations will be repeated on multiple hosts), many local controllers will not need to perform the full computation. In some such embodiments, only the host machines that are directly affected by the change will even receive the change, resulting in less computation.

Returning to FIG. 11, the process 1100 determines (at 1115) whether any computations require the central controllers and performs (at 1120) these required computations. This determination depends on the type of change in some embodiments. For instance, if the administrator changes the definition of a profile (e.g., changing the settings specified by the profile), then in this case the central controller already stores the data indicating the logical ports to which the profile applies, and can provide the revised profile settings to these ports.

For changes to the application of profiles to logical entities, the computations can be more complicated. In the example of FIG. 12, the change in group membership affects all of the logical ports indirectly, as the ports are members of groups the membership of which is affected. That is, in some embodiments the host machines are initially provided the full group membership definitions for all relevant groups, and these groups are modified by the change. However, for such a change, the central controller does not need to perform the relevant change computations in some embodiments, as the local controllers already have the necessary information to process this change. However, certain types of profile application changes do require central control plane computation. For example, if a firewall rule that is defined in terms of source and destination logical ports is applied to a new logical port, then the central controller is required to translate this into MAC and/or IP addresses of the logical ports (while the local controller at a host machine implementing the source port would have that source port's addresses, it would not necessarily be able to fill in the destination logical port addresses).

The process 1100 then determines (at 1125) the host machines that should receive the changes and distributes (at 1130) these changes to the hosts. This allows the host machines to complete the computations and update the logical port configurations as needed. For changes such as those shown in FIG. 12, the central controllers of some embodiments send the change to all of the host machines, rather than only the host 1210. In other embodiments, the first and second hosts do not receive the change because their logical ports are not members of affected groups. On the other hand, the third, fourth, and fifth hosts have logical ports that belong to logical switches that are members of the third entity group 1220, the membership of which has changed. The hosts other than host 1210 that receive the update process this change, but do not make any changes to their configurations. The new group definitions, however, are stored by the hosts in case other changes are later provided. The local controller on the host 1210 computes the group membership changes and determines that Profile B and Profile C no longer apply to logical port 1205, and thus changes the configuration of the logical port 1205 as implemented by its managed forwarding element.

Figure 13:
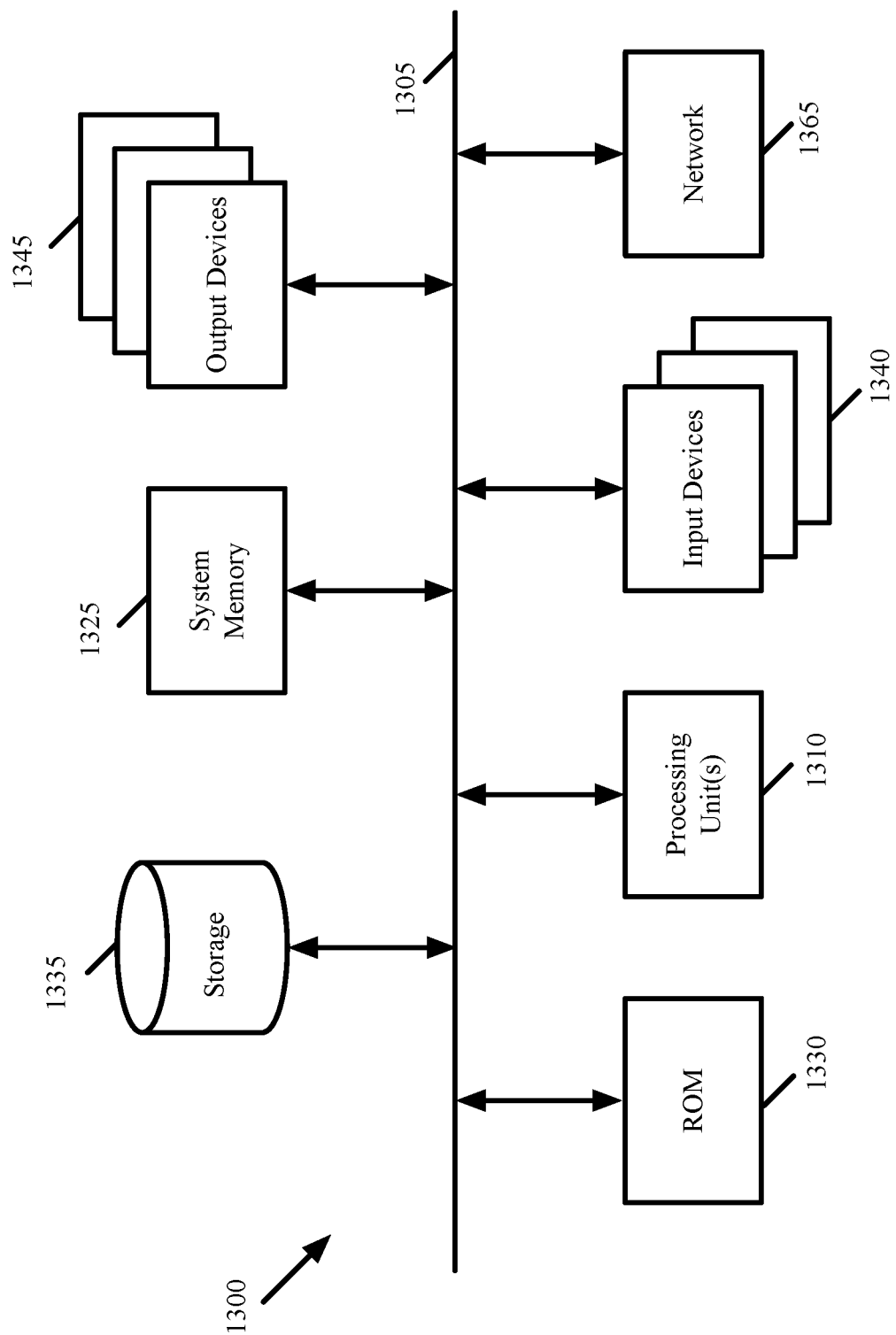
FIG. 13 conceptually illustrates an electronic system with which some embodiments of the invention are implemented.

FIG. 13 conceptually illustrates an electronic system 1300 with which some embodiments of the invention are implemented. The electronic system 1300 can be used to execute any of the control, virtualization, or operating system applications described above. The electronic system 1300 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1300 includes a bus 1305, processing unit(s) 1310, a system memory 1325, a read-only memory 1330, a permanent storage device 1335, input devices 1340, and output devices 1345.

The bus 1305 collectively represents all system, peripheral, and chipset buses that communicatively connect the numerous internal devices of the electronic system 1300. For instance, the bus 1305 communicatively connects the processing unit(s) 1310 with the read-only memory 1330, the system memory 1325, and the permanent storage device 1335.

From these various memory units, the processing unit(s) 1310 retrieve instructions to execute and data to process in order to execute the processes of the invention. The processing unit(s) may be a single processor or a multi-core processor in different embodiments.

The read-only-memory (ROM) 1330 stores static data and instructions that are needed by the processing unit(s) 1310 and other modules of the electronic system. The permanent storage device 1335, on the other hand, is a read-and-write memory device. This device is a non-volatile memory unit that stores instructions and data even when the electronic system 1300 is off. Some embodiments of the invention use a mass-storage device (such as a magnetic or optical disk and its corresponding disk drive) as the permanent storage device 1335.

Other embodiments use a removable storage device (such as a floppy disk, flash drive, etc.) as the permanent storage device. Like the permanent storage device 1335, the system memory 1325 is a read-and-write memory device. However, unlike storage device 1335, the system memory is a volatile read-and-write memory, such a random-access memory. The system memory stores some of the instructions and data that the processor needs at runtime. In some embodiments, the invention's processes are stored in the system memory 1325, the permanent storage device 1335, and/or the read-only memory 1330. From these various memory units, the processing unit(s) 1310 retrieve instructions to execute and data to process in order to execute the processes of some embodiments.

The bus 1305 also connects to the input and output devices 1340 and 1345. The input devices enable the user to communicate information and select commands to the electronic system. The input devices 1340 include alphanumeric keyboards and pointing devices (also called "cursor control devices"). The output devices 1345 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 13, bus 1305 also couples electronic system 1300 to a network 1365 through a network adapter (not shown). In this manner, the computer can be a part of a network of computers (such as a local area network ("LAN"), a wide area network ("WAN"), or an Intranet, or a network of networks, such as the Internet. Any or all components of electronic system 1300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 8 and 11) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. For a network controller, a method comprising:
   receiving network configuration data comprising an association of an entity configuration profile to a logical entity group that references at least two logical network entities, the entity configuration profile comprising a set of configuration settings to apply to logical network entities with which the entity configuration profile is associated, wherein at least one of the logical network entities is implemented across a plurality of host computers;
   associating the entity configuration profile with each of the logical network entities referenced by the logical entity group;
   based on the associations of the entity configuration profile with the logical network entities, determining a plurality of host computers that require the configuration data for the entity configuration profile, the plurality of host computers comprising each host computer on which at least one of the logical network entities is implemented, wherein at least one of the host computers implements more than one of the logical network entities; and
   distributing the entity configuration profile to the plurality of host computers.

2. The method of claim 1, wherein the network controller receives the network configuration data from a network manager, wherein the network manager comprises an application programming interface (API) through which a user provides the association of the entity configuration profile to the logical entity group.

3. The method of claim 1, wherein the logical network entities comprise logical switches and logical switch ports.

4. The method of claim 3, wherein each logical switch port is mapped to a particular host computer.

5. The method of claim 4, wherein determining the plurality of host computers that require the configuration data comprises identifying the host computers to which each logical switch port referenced by the logical entity group maps.

6. The method of claim 5, wherein at least one of the logical network entities referenced by the logical entity group is a logical switch having a plurality of logical switch ports, wherein associating the entity configuration profile with the logical network entities referenced by the logical entity group comprises automatically associating the entity configuration profile with the plurality of logical switch ports.

7. The method of claim 1, wherein the entity configuration profile comprises configuration settings for at least one of quality of service, security, and IP Flow Information Export (IPFIX).

8. The method of claim 1, wherein the entity configuration profile comprises a set of distributed firewall rules.

9. The method of claim 1, wherein:
   the logical entity group is a first logical entity group and the plurality of host computers is a first plurality of host computers;
   in addition to referencing the at least two logical network entities, the first logical entity group references a second logical entity group that references at least two additional logical network entities; and
   at least one of the additional logical network entities is implemented across a second plurality of host computers.

10. The method of claim 9, wherein associating the entity configuration profile with each of the logical network entities comprises associating the entity configuration profile with the additional logical network entities referenced by the second logical entity group.

11. The method of claim 1, wherein:
    the entity configuration profile comprises a first set of configuration settings for a particular property of the logical network entities;
    a second entity configuration profile comprising a second, different set of configuration settings for the particular property is also associated with a particular one of the logical network entities;
    the method further comprises determining which of the first and second entity configuration profiles has a higher priority; and
    the network controller only associates the higher-priority of the first and second entity configuration profiles with the particular logical network entity.

12. The method of claim 1 further comprising:
    receiving configuration data removing a particular logical network entity from the logical entity group; and
    in response to the receipt of the configuration data removing the particular logical network entity from the logical entity group, distributing a logical entity group update to a particular host computer on which the particular logical network entity is implemented, wherein other host computers in the plurality of host computers do not receive the logical entity group update.

13. A non-transitory machine-readable medium storing a network controller program for execution by at least one processing unit, the network controller program comprising sets of instructions for:
    receiving network configuration data comprising an association of an entity configuration profile to a logical entity group that references at least two logical network entities, the entity configuration profile comprising a set of configuration settings to apply to logical network entities with which the entity configuration profile is associated, wherein at least one of the logical network entities is implemented across a plurality of host computers;
    associating the entity configuration profile with each of the logical network entities referenced by the logical entity group;
    based on the associations of the entity configuration profile with the logical network entities, determining a plurality of host computers that require the configuration data for the entity configuration profile, the plurality of host computers comprising each host computer on which at least one of the logical network entities is implemented, wherein at least one of the host computers implements more than one of the logical network entities; and
    distributing the entity configuration profile to the plurality of host computers.

14. The non-transitory machine-readable medium of claim 13, wherein the network controller program receives the network configuration data from a network manager, wherein the network manager comprises an application programming interface (API) through which a user provides the association of the entity configuration profile to the logical entity group.

15. The non-transitory machine-readable medium of claim 13, wherein the logical network entities comprise logical switches and logical switch ports, wherein each logical switch port is mapped to a particular host computer.

16. The non-transitory machine-readable medium of claim 15, wherein the set of instructions for determining the plurality of host computers that require the configuration data comprises a set of instructions for identifying the host computers to which each of the logical switch ports referenced by the logical entity group maps.

17. The non-transitory machine-readable medium of claim 16, wherein at least one of the logical network entities referenced by the logical entity group is a logical switch having a plurality of logical switch ports, wherein the set of instructions for associating the entity configuration profile with the logical network entities referenced by the logical entity group comprises a set of instructions for automatically associating the entity configuration profile with the plurality of logical switch ports.

18. The non-transitory machine-readable medium of claim 13, wherein:
   the logical entity group is a first logical entity group and the plurality of host computers is a first plurality of host computers;
   in addition to referencing the at least two logical network entities, the first logical entity group references a second logical entity group that references at least two additional logical network entities;
   at least one of the additional logical network entities is implemented across a second plurality of host computers; and
   the set of instructions for associating the entity configuration profile with each of the logical network entities comprises a set of instructions for associating the entity configuration profile with the additional logical network entities referenced by the second logical entity group.

19. The non-transitory machine-readable medium of claim 13, wherein:
   the entity configuration profile comprises a first set of configuration settings for a particular property of the logical network entities;
   a second entity configuration profile comprising a second, different set of configuration settings for the particular property is also associated with a particular one of the logical network entities;
   the network controller program further comprises a set of instructions for determining which of the first and second entity configuration profiles has a higher priority; and
   the network controller program only associates the higher-priority of the first and second entity configuration profiles with the particular logical network entity.

20. The non-transitory machine-readable medium of claim 13, wherein the network controller program further comprises sets of instructions for:
   receiving configuration data removing a particular logical network entity from the logical entity group; and
   in response to the receipt of the configuration data removing the particular logical network entity from the logical entity group, distributing a logical entity group update to a particular host computer on which the particular logical network entity is implemented, wherein other host computers in the plurality of host computers do not receive the logical entity group update.

* * * * *